(12) United States Patent
Reid et al.

(10) Patent No.: US 9,282,728 B2
(45) Date of Patent: Mar. 15, 2016

(54) AQUARIUM WITH AN INTEGRATED CLEANING SYSTEM

(71) Applicant: Rolf C. Hagen Inc., Montreal (CA)

(72) Inventors: Robert Reid, St. Lazare (CA); Marc Lafond, Laval (CA)

(73) Assignee: Rolf C. Hagen Inc., Montreal (CA)

( * ) Notice: Subject to any disclaimer, the term of this patent is extended or adjusted under 35 U.S.C. 154(b) by 131 days.

(21) Appl. No.: 13/928,123

(22) Filed: Jun. 26, 2013

(65) Prior Publication Data
US 2015/0000607 A1 Jan. 1, 2015

(51) Int. Cl.
*A01K 63/00* (2006.01)
*A01K 63/04* (2006.01)

(52) U.S. Cl.
CPC .................. *A01K 63/045* (2013.01)

(58) Field of Classification Search
USPC ......... 119/248, 245, 246, 247, 269, 264, 259, 119/260, 251, 252; 210/167.21, 167.23, 210/167.27
See application file for complete search history.

(56) References Cited

U.S. PATENT DOCUMENTS

| | | | |
|---|---|---|---|
| 3,321,081 A * | 5/1967 | Willinger | 210/167.25 |
| 3,418,973 A | 12/1968 | Saito | |
| 3,584,602 A * | 6/1971 | Stasio | 119/252 |
| 3,759,223 A | 9/1973 | D'Andrea | |
| 3,785,342 A | 1/1974 | Rogers | |
| 3,900,004 A * | 8/1975 | Goldman et al. | 119/252 |
| 4,957,623 A | 9/1990 | Henzlik | |
| 5,690,054 A | 11/1997 | Allen | |
| 5,849,185 A | 12/1998 | Judy, Jr. | |
| 6,276,302 B1 * | 8/2001 | Lee | 119/260 |
| 6,352,051 B1 * | 3/2002 | Wang | 119/252 |
| 6,533,928 B1 | 3/2003 | Terato | |
| 6,755,154 B1 | 6/2004 | Goldman et al. | |
| 6,755,981 B2 | 6/2004 | Terato | |
| 7,303,665 B1 | 12/2007 | Claudio-Alvarado | |
| 7,537,692 B1 | 5/2009 | Hadden | |
| 8,006,646 B2 | 8/2011 | Grad | |
| 8,347,820 B2 | 1/2013 | Sigmon et al. | |
| 2007/0119381 A1 | 5/2007 | Chang | |
| 2012/0325755 A1 | 12/2012 | Turover et al. | |

* cited by examiner

*Primary Examiner* — Trinh Nguyen
(74) *Attorney, Agent, or Firm* — Wolf, Greenfield & Sacks, P.C.

(57) ABSTRACT

Various embodiments of an aquarium and its method of use are disclosed. In some embodiments the aquarium includes a first container including a waste collection area, an outlet, and a conduit fluidly connecting the waste collection area and the outlet. Depending upon the particular embodiment, the aquarium may also include features such as a second container adapted and configured to mate with the first container and receive the outlet such that fluid flows from the waste collection area through the outlet and into the second container when fluid is added above a preselected fluid level. In other related embodiments, the conduit may be formed by first and second portions of the conduit formed in the first container and a separate component.

25 Claims, 6 Drawing Sheets

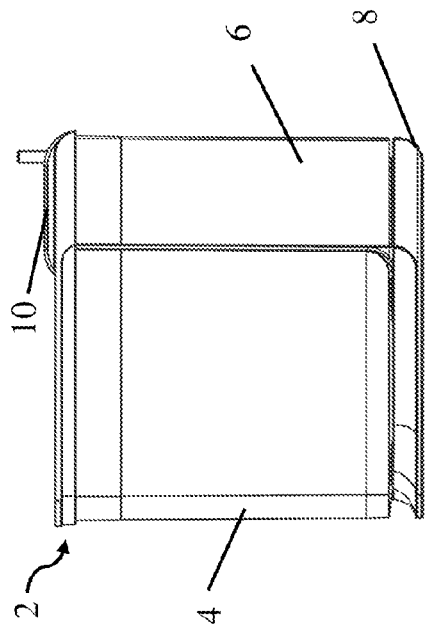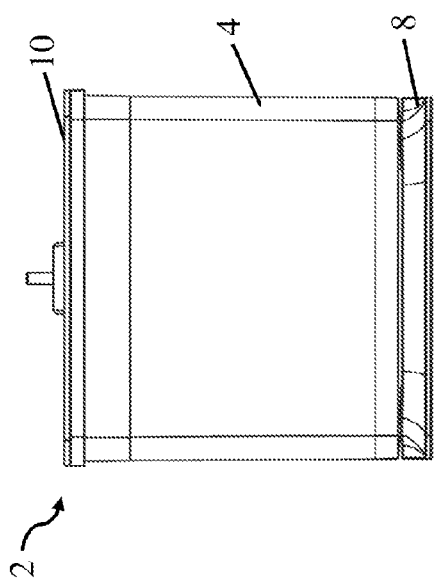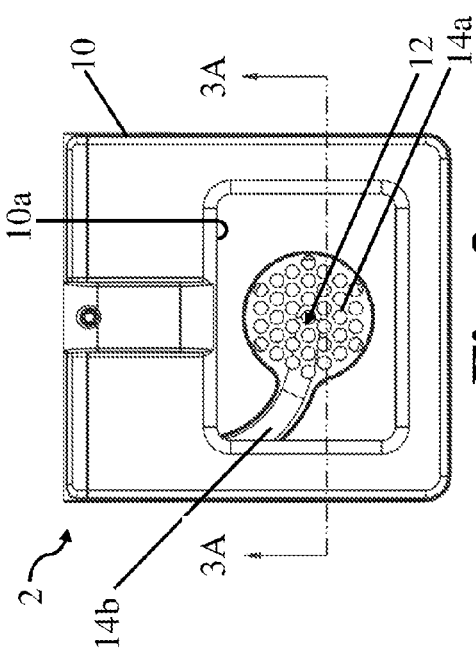

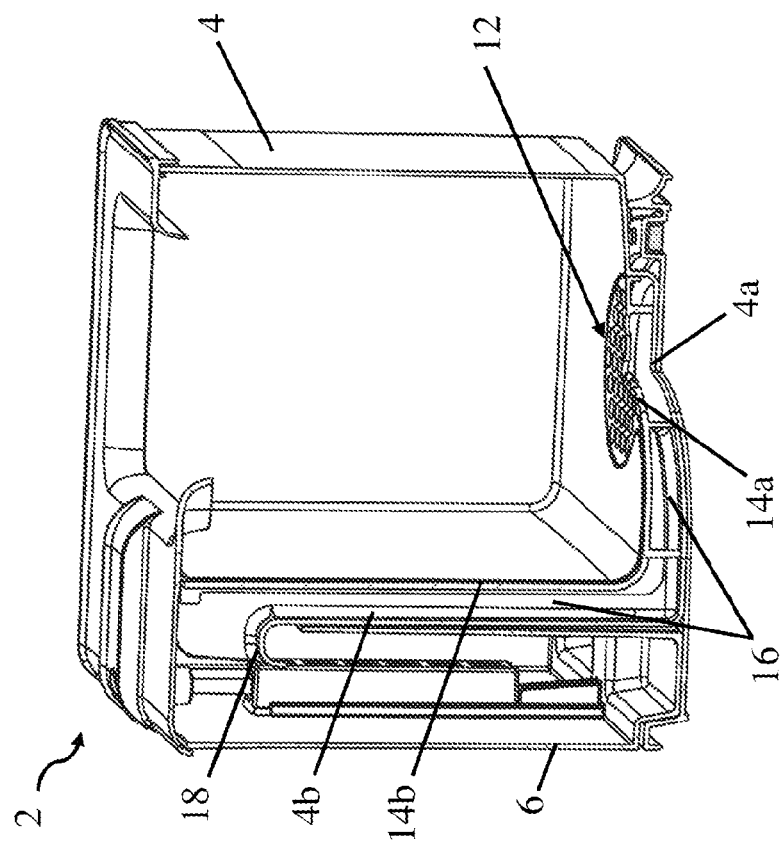
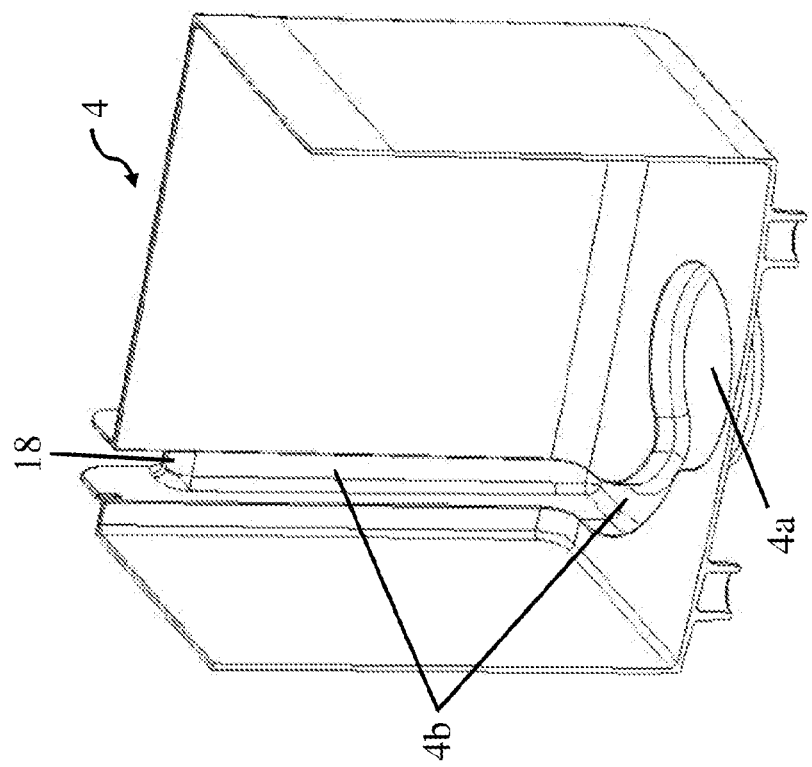
Fig. 5B
Fig. 5A

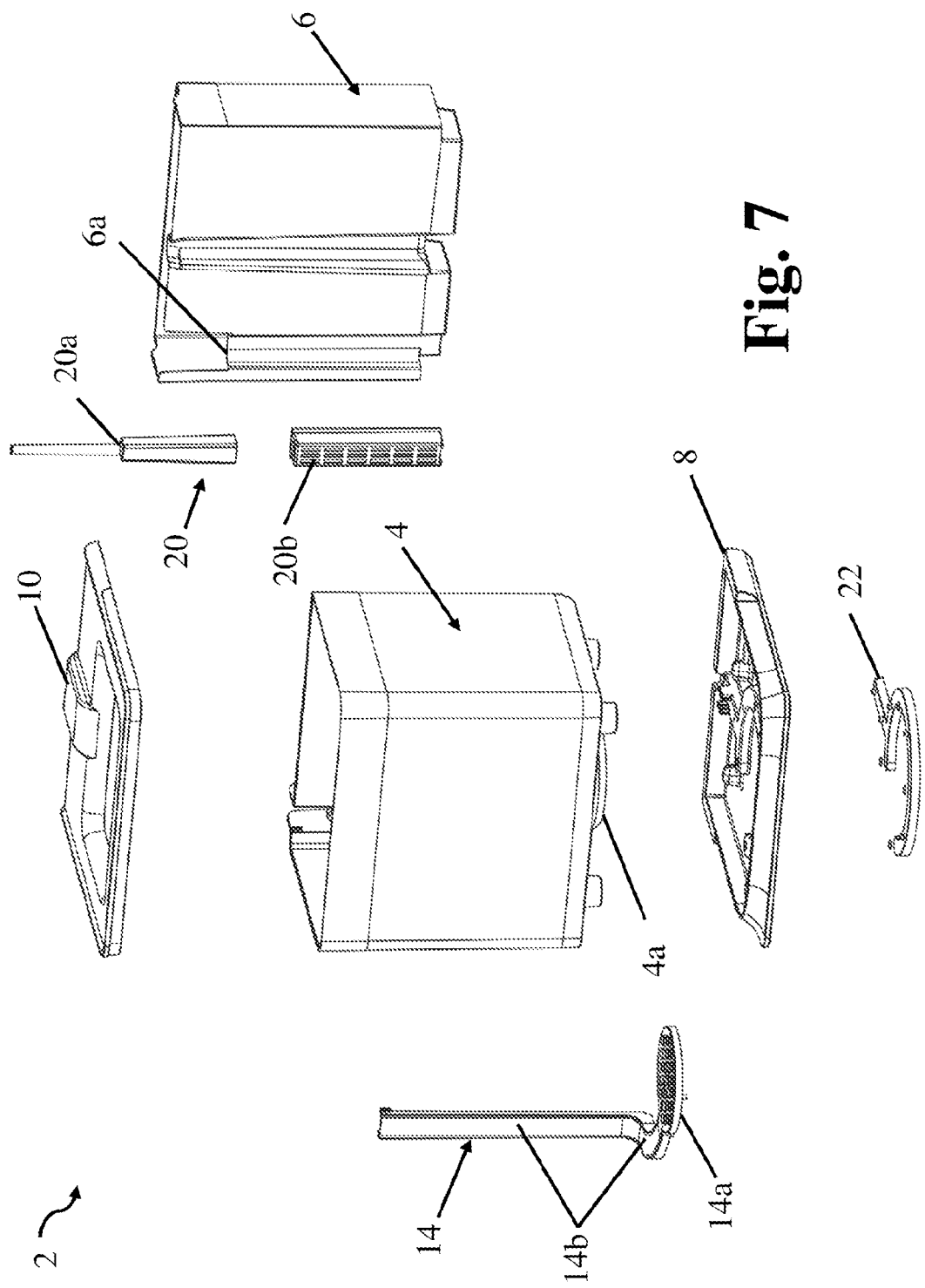

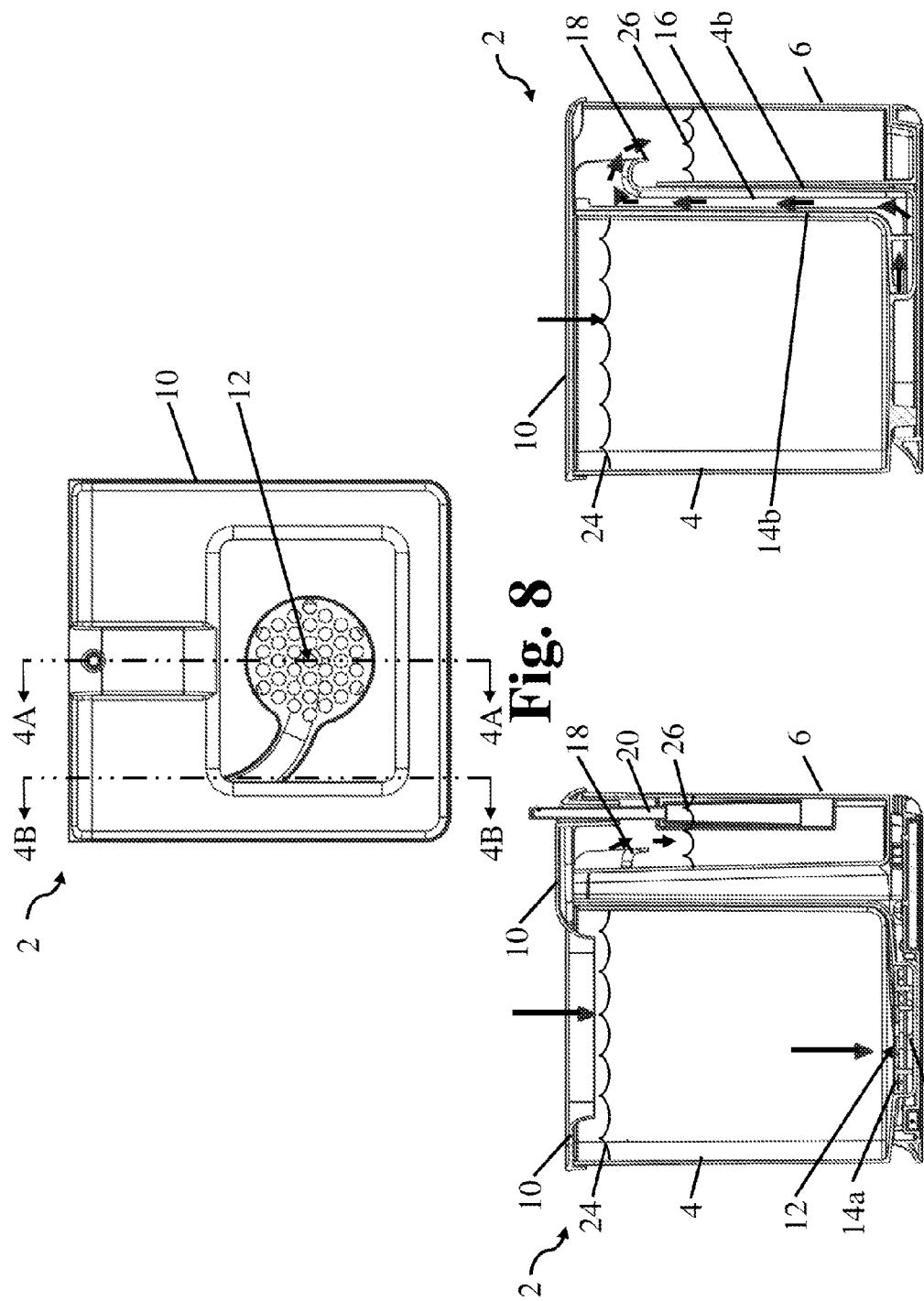

AQUARIUM WITH AN INTEGRATED CLEANING SYSTEM

FIELD

Disclosed embodiments are related to an aquarium with an integrated cleaning system.

BACKGROUND

Aquariums provide an environment for keeping fish and other aquatic organisms. Over time waste and debris from the fish and other aquatic organisms as well as bacteria, algae, and uneaten food accumulate within the aquarium. Consequently, to help maintain the health of the fish and other aquatic organisms living in the aquarium, it is necessary to periodically remove the built-up waste and debris. Further, after a certain period of time, it is also necessary to replace the water within the aquarium.

SUMMARY

In one embodiment, an aquarium includes a first container adapted to hold a fluid. The first container includes a waste collection area, an outlet, and a conduit. The conduit fluidly connects the waste collection area and the outlet such that fluid flows from the waste collection area to the outlet when fluid is added above a preselected fluid level. The aquarium also includes a second container adapted to hold a fluid. The second container is adapted and configured to mate with the first container and receive the outlet. Additionally, fluid flows from the waste collection area through the outlet and into the second container when fluid is added above the preselected fluid level.

In another embodiment, an aquarium includes a first container adapted to hold a fluid. The first container includes a waste collection area and an outlet. The first container forms at least a first portion of a conduit fluidly connecting the waste collection area and the outlet. The aquarium also includes a component including a second portion of the conduit. The component is positionable relative to the second portion of the conduit to form the conduit between the first portion of the conduit and the second portion of the conduit.

In yet another embodiment, a method for removing waste and debris from an aquarium includes: mating a second container to a first container, wherein the second container is adapted and configured to receive an outlet of the first container; and adding fluid to the first container to raise a fluid level in the first container to a height greater than a preselected fluid level, wherein fluid flows from a waste collection area of the first container through the outlet of the first container and into the second container while the fluid level is greater than the preselected fluid level.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 1 is a schematic front view of an aquarium;
FIG. 2 is a schematic side view of an aquarium;
FIG. 3 is a schematic top view of an aquarium;
FIG. 3A is a schematic cross-sectional view of the aquarium from FIG. 3;
FIG. 5A is a schematic perspective view of a cross-section of the first container illustrating the recesses formed therein;
FIG. 5B is a schematic perspective view of a partial cross-section of an aquarium illustrating the conduit;
FIG. 7 is a schematic exploded rear perspective view of the aquarium of FIG. 6;
FIG. 8 is a schematic top view of an aquarium;
FIG. 8A is a schematic cross-sectional view of the aquarium from FIG. 8 depicting fluid flow through the conduit;
and
FIG. 8B is a schematic cross-sectional view of the aquarium from FIG. 8 depicting fluid flow through the conduit.

DETAILED DESCRIPTION

Figure 4A:
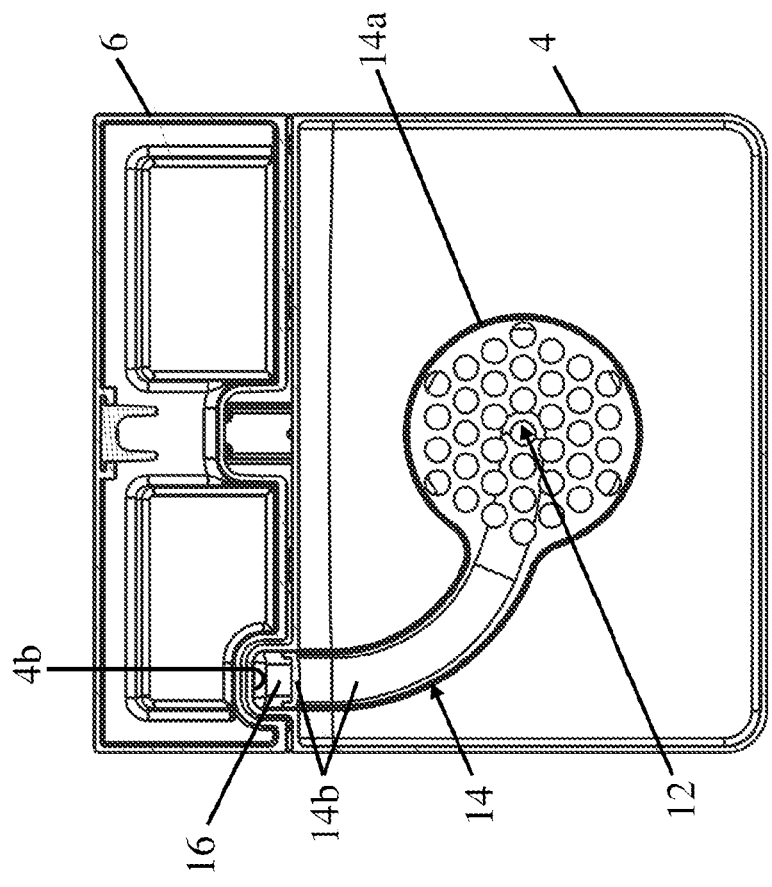
FIG. 4A is a schematic cross-sectional view of the aquarium from FIG. 4.
Figure 4:
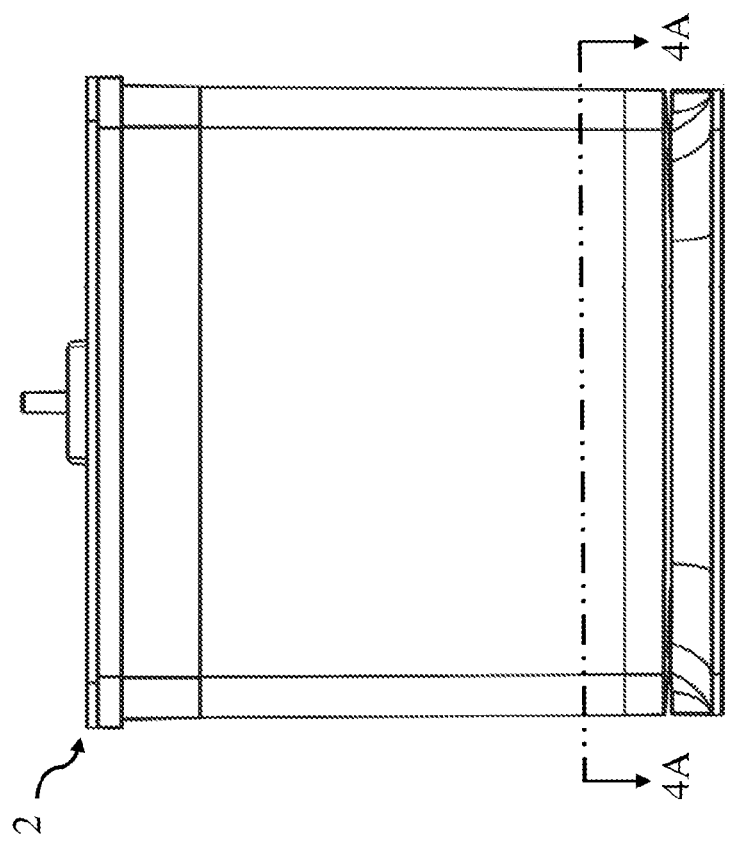
FIG. 4 is a schematic front view of an aquarium.

The inventors have recognized a need for an aquarium that provides both simple removal of waste and debris as well as replacement of water. The inventors also recognized that it is desirable to reduce the chance of spillage during the removal of waste and the replacement of water since such maintenance tends to be messy and laborious. Additionally, in at least some embodiments, it is desirable that such an aquarium be easily manufactured, and readily assembled. However, it should be understood that the currently disclosed concepts may be implemented in any appropriate aquarium regardless of the ease of construction and/or assembly.

Generally, in some embodiments, the aquarium includes a first container which acts as the primary aquarium for containing the fish, plants, and/or other aquatic organisms. This first container includes a waste collection area, an outlet, and a conduit fluidly connecting the waste collection area and the outlet. The waste collection area may be defined by features such as a recess located on a bottom surface of the aquarium. Alternatively, one or more separate structures may be located within the aquarium to define the waste collection area. For example, a conical structure, or other appropriately shaped structure, might be located on the bottom surface of the aquarium to define a waste collection area. As described in more detail below, the outlet is located at a height relative to the bottom surface of the aquarium corresponding to a preselected fluid level above which fluid flows from the aquarium, through the conduit, and to the outlet as described below.

The disclosed embodiments facilitate the removal of waste and debris from the aquarium, as well as changing the fluid within the aquarium, by simply adding fluid to the first container. As fluid is added to the first container, the fluid level within the first container increases. Fluid may be added to the first container until the level of fluid within the first container is greater than the preselected fluid level corresponding to the height of the outlet. As described in more detail below with regards to the figures, and without wishing to be bound by theory, a pressure differential is created between the waste collection area and the outlet due to the fluid level within the first container being greater than the height of the outlet.

Consequently, the fluid within the first container flows from the waste collection area, through the conduit, and to the outlet. In addition to fluid flowing from the waste collection area to the outlet, waste and debris located in the waste collection area is entrained with the flowing fluid such that it is transported along with the fluid to the outlet. This transport of the waste and debris to the outlet from the waste collection area results in the removal of the waste and debris from the first container.

Depending on the embodiment, an aquarium may include a second container associated with the first container that functions as an overflow or waste container. In certain embodiments, a second container is adapted and configured to mate with a first container. In such an embodiment, the second container has a complementary shape, height, width, and/or any other appropriate geometry such that it is associated with the first container. For example, the second container may extend along an entire side or surface of the first container, or the second container might extend along only a portion of a side or surface of the first container. It is also possible that the second container may be located within an inner perimeter of the first container such as a smaller cylinder located within a larger surrounding cylinder. In view of the above, it should be understood that any appropriate geometry may be used for both a first and a second container such that they are associated with one another.

In addition to being associated with a first container, in some embodiments, a second container is adapted and configured to receive the outlet of the first container. For example, a second container may include an inlet corresponding to a shape, size, and location of the outlet of the first container. Alternatively, a second container may simply include a slot or open space to accommodate an outlet of a first container as the disclosure is not limited to any particular geometry or arrangement. In yet another embodiment, a first container and a second container might include mating valves to connect an outlet of the first container and a corresponding inlet of the second container. However, regardless of the specific inlet and outlet arrangement, when fluid is added to the first container such that it is above the preselected fluid level as described above, the fluid as well as the waste and debris located within the waste collection area flows from the waste collection area, through the conduit, to the outlet, and into the second container.

Depending on the particular embodiment, fluid may be added to a first container until either substantially all of the waste and debris is removed, or until an associated second container is full. If desired, additional fluid may be added to the first container after flushing the waste and debris to replace at least a portion of the fluid located within the first container with new fluid. In either case, fluid may be added to the first container until the second container is full. The second container may then be emptied and replaced. Additional fluid may then be added to the first container if necessary or desired. Thus, waste and debris may be removed from the waste collection area and/or at least a portion of the fluid within the first container may be replaced with fresh fluid without necessitating the removal of the fish, other aquatic organisms, plants, or objects from an aquarium.

In addition to the above, in some embodiments, a conduit located within a first container may be integrated with the first container. In such an embodiment, the first container forms a first portion of a conduit fluidly connecting a waste collection area and an outlet and a separate related component includes a second corresponding portion of the conduit. The component is assembled with the first container such that the first and second portions of the conduit are positioned adjacent to one another to form the conduit there between. Depending on the embodiment, the component is either permanently, or removably, attached to the first container. A removable component may provide the advantage of permitting cleaning of the conduit interior without the need for flexible cleaning implements. It should be understood that any appropriate attachment method may be used to attach the component to the first container. For example, sonic welds, adhesives, mechanical interlocking features, interference fits, or any other appropriate attachment methods may be used. Further, depending on the particular attachment method it may be advantageous to use a sealant or gasket located between the first and second portions of the conduit to minimize leakage of fluid from the conduit. While only a single component and two separate portions of the conduit are noted above, it should be understood that multiple components and any number of separate portions of the conduit might be provided as the current disclosure is not limited in this fashion.

A first portion of a conduit formed in a first container may correspond to any appropriate feature capable of defining a portion of the conduit. For example, the first portion of the conduit may correspond to a channel extending between a waste collection area and an outlet position along one or more interior surfaces of the first container. Alternatively, in some embodiments, the first portion of the conduit may simply correspond to the sides of the first container and the other portion of the conduit may be defined by an appropriate geometry on a separate component. The first portion of the conduit incorporated in the first container, may be formed using injection molding, blow molding, vacuum forming, machining, or any other appropriate manufacturing method.

Similar to the above, a second portion of a conduit incorporated with a separate component may also correspond to any appropriate feature capable of defining a portion of the conduit in cooperation with a first container. For example, in the embodiment described above in which the first portion of the conduit corresponds to a channel provided between the waste collection area and the outlet, a corresponding channel, or flat, on the separate component is shaped and arranged to mate with the channel extending between the waste collection area and the outlet of the first container to form the conduit. In view of the above, it should be understood that similar to the first portion of the conduit provided by the first container, the second portion of the conduit may correspond to any appropriate construction, arrangement, and/or geometry. Further, the component and the corresponding second portion of the conduit may be formed in any appropriate fashion similar to the first container and the first portion of the conduit.

Turning now to the figures, specific embodiments of the currently disclosed aquarium are described in more detail.

FIGS. 1 and 2 present front and side views of one embodiment of an aquarium 2. The aquarium 2 includes a first container 4 corresponding to the primary water container for holding the fish, plants, and other aquatic organisms. In the depicted embodiment, the aquarium also includes a second container 6 corresponding to a waste or overflow container that is separate from the first container 4. The aquarium 2 also includes a base 8 and a cover 10. While a single cover 10 covering both the first container 4 and the second container 6 has been depicted, separate covers for each container may also be provided. Additionally, as illustrated in FIG. 3, in some embodiments, the cover 10 includes a window 10a for viewing and/or accessing the aquarium from the top.

While the depicted first container 4 and second container 6 have rectangular cross-sections, any appropriate shape could have been used. Further, the first container may be any appropriate size to contain a sufficient amount of fluid to meet the needs of a particular aquatic organism or other consideration. The second container 6 may also be sized to contain any appropriate volume of fluid. For example, the second container 6 might be adapted to hold a volume of fluid equal to the first container 4, or a volume that is less than the first container 4, as the current disclosure is not limited as to the size of the second container 6 relative to the first container 4. The second container may also be any appropriate shape such that it is adapted and configured to mate with and receive fluid from the first container.

In addition to the sizes and geometries of the first and second containers, the first and second containers may also be made from any appropriate material including, but not limited to, polycarbonate, glass, and laminated glass. In one embodiment, polycarbonate, or another appropriate polymeric material, may be selected to facilitate manufacture of the aquarium using appropriate polymer manufacturing techniques such as blow molding, vacuum forming, and injection molding. However, it should be understood that any appropriate manufacturing method can be used.

Figure 6:
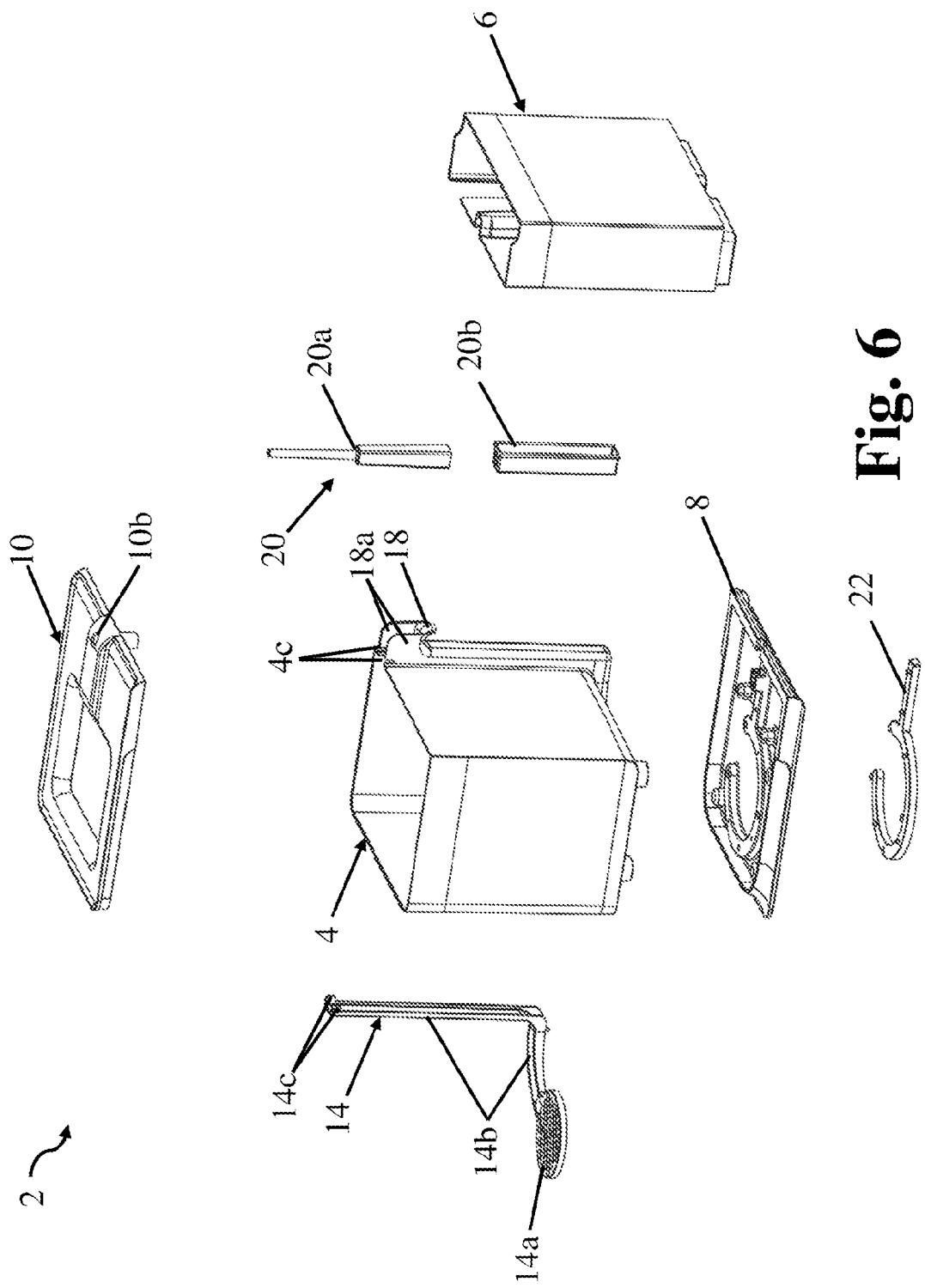
FIG. 6 is a schematic exploded front perspective view of an aquarium.

In the embodiment depicted in the figures, the base 8 is adapted and configured to accept and retain both the first container 4 and the second container 6, see FIGS. 1, 6, and 7. Further, the base 8 maintains the position and orientation of the first and second containers relative to one another while they are located on the base. Depending on the embodiment, the first container 4 may be permanently, or removably, attached to the base 8. To facilitate removal of waste and water spillage from the first container, in some embodiments, the second container is removable from the base. The base 8 may retain the first and second containers using any appropriate method including, but not limited to, corresponding recesses, screws, bolts, clips, mechanically interlocking components, adhesives, sonic welds, and/or combinations of the above. Further, the base 8 may also be made from any appropriate material. For example, in one embodiment, the base is made from an opaque material. However, embodiments in which the base 8 is made from a transparent material to facilitate viewing through the base are also envisioned.

As depicted in FIG. 3A, the base 8 may also include lights 22 to illuminate the aquarium. The depicted lights 22 correspond to a plurality of LEDs positioned in a recess formed in the base 8. However, while the lights 22 have been depicted as being incorporated into the base 8, it should be understood, that if desired, the lights 22 could be incorporated into other portions of the aquarium including, but not limited to, the first container 4, the second container 6, the cover 10, or any other appropriate component of the aquarium.

As illustrated by FIGS. 3-5B and 8-8B, the aquarium 2 includes a component 14 that is associated with the first container 4 to form a drain 12 and conduit 16 for the removal of waste and debris from the bottom of the first container 4. In the depicted embodiment, the drain 12 includes a cover plate 14a formed as part of the component 14 and a waste collection area 4a formed in the first container 4. The conduit 16 is formed from a first portion of the conduit 4b formed in the first container 4 and a corresponding second portion of the conduit 14b provided by the component 14. The conduit 16 is in fluid communication with the drain 12 and an outlet 18 provided on a side of the first container 4. While the cover plate 14a and the second portion of the conduit 14b have been depicted as part of a single component 14, in some embodiments, the cover plate 14a and the second portion of the conduit 14b may be provided as separate components.

In the depicted embodiment, the drain 12 is located on a bottom surface of the first container 4. As noted above, the drain 12 includes a cover plate 14a disposed on top of the waste collection area 4a, see FIGS. 3A, 4A, and 5A-5B. In the depicted embodiment, the cover plate 14a is substantially flush with the interior bottom surface of the first container 4 surrounding the waste collection area 4a and a plurality of holes are formed in the cover plate 14a. However, it should be understood, that in other embodiments, the cover plate 14a might not be flush with the first container. Further, in the depicted embodiment, the plurality of holes are appropriately sized and shaped to separate the larger materials and organisms located within the main portion of the first container 4 from the waste collection area 4a while permitting the passage of fluid as well as waste and debris into the waste collection area 4a. Thus, in some embodiments, the drain 12 might be used as an under gravel system for flushing waste and debris from the first container. It should be understood though the depicted drain could also be used without gravel or other material on top of it. While a particular cover plate is depicted, any appropriate cover plate could be used including, but not limited to, wire screens and other plate geometries with appropriately sized, shaped, and arranged slots or holes.

Referring to FIGS. 5A, the waste collection area 4a is a circular recess located on the bottom surface of the first container 4. However, any number of different arrangements, shapes, and configurations are possible. As such, the current disclosure is not limited to any specific waste collection area. For example, a conical surface, or other appropriate geometry, may be formed on the bottom surface of the first container 4 to function as the waste collection area 4a. Additionally, an appropriately shaped insert may be provided within the first container 4 to provide a waste collection area 4a on the bottom surface of the first container 4. Consequently, the waste collection area 4a may correspond to any appropriate feature capable of collecting and retaining waste and debris from within the first container 4.

In addition to the drain 12, the aquarium 2 also includes a conduit 16 fluidly connecting the waste collection area 4a and the outlet 18. As illustrated by FIGS. 4A, 5B, and 8B, the first container 4 includes a first portion of the conduit 4b corresponding to a channel extending along the bottom surface of the first container from the waste collection area 4a towards a rear corner of the first container 4. The first portion of the conduit 4b then extends up a side surface of the first container 4 to the outlet 18, see FIG. 5A. As noted above, the component 14 includes the corresponding second portion of the conduit 14b. The second portion of the conduit 14b has a profile and cross-section such that it cooperates with the first portion of the conduit 4b to form the conduit. In some embodiments, the first and second portions may match and complement one another to form the conduit. In the depicted embodiment, the second portion of the conduit 14b is a section of the component 14 that extends horizontally along a curve from the cover plate 14a and then vertically to an upper end of the component 14. This somewhat L shaped construction of the component 14 is clearly illustrated in FIGS. 6 and 7. In addition to appropriately positioning the second portion of the conduit 14b adjacent to the first portion of the conduit 4b, the component 14 may be shaped and arranged to locate the cover plate 14a above the waste collection area 4a. However, as noted above, in some embodiments the cover plate 14a may be provided separately.

Having described the general arrangements of the first and second portions of the conduit, more specific features of the current embodiment are described with regards to FIGS. 4A and 5B. In the depicted embodiment, the channels corresponding to the first portion of the conduit 4b and the second portion of the conduit 14b are assembled along their lengths to form the conduit 16 there between. The conduit 16 extends along the bottom of the first container 4 from the waste collection area 4a towards a rear corner of the first container 4 and up a side of the first container 4 to the outlet 18. The first portion of the conduit 4b extends up to, and forms part of the outlet 18, see FIG. 5A. The corresponding second portion of the conduit 14b extends to a height greater than the height of the outlet 18 such that it separates the conduit 16 and the outlet 18 from the main portion of the first container 4 when it is appropriately positioned within the first container 4. In some embodiments, the second portion of conduit 14b may extend up to the top of the first container 4. However, it should be understood, that other embodiments in which the second portion of the conduit 14b only extends up to the height of the outlet, or any other appropriate height, are also envisioned.

As previously noted, the first portion of the conduit 4b and second portion of the conduit 14b are constructed and arranged to complement one another and form the conduit 16. Therefore, while the figures depict an embodiment including two U-shaped channels with the sidewalls of the component 14 being retained within the channel formed in the first container 4, see FIG. 4B, other appropriate constructions with different cross-sectional shapes and arrangements are possible. For example, the first and second portions of the conduit may be constructed such that one fits within the other, one overlaps the other, they mate along their edges, or any other appropriate arrangement. In one particular embodiment the first and second portions of the conduit correspond to a flat cross-section mated with a corresponding channel to form the conduit there between.

In addition to different possible cross-sectional shapes and arrangements, in some embodiments the first and second portions of the conduit are sealed along their corresponding lengths to provide a substantially leakfree conduit. This seal between the first and second portions of the conduit may be provided in any appropriate manner. For example, the seal might be provided by an interference fit, an adhesive, a weld along the seam, a gasket, and/or any other appropriate method. However, depending on the desired design requirements, the seal between the first and second portions of conduit may not be entirely leakfree. Instead, the first and second portions of the conduit may be sealed such that a leakage rate from the conduit during use is below a preselected threshold.

FIGS. 6 and 7 depict various exploded perspective views of the aquarium 2 and its individual components. The perspective views help to illustrate the relative positioning and design of the first container 4, the second container 6, the base 8, the cover 10, and the component 14. For example, the spout corresponding to the outlet 18 located in the first container 4 is clearly illustrated in FIG. 6. In the depicted embodiment, the spout 18 includes sidewalls 18a that extend upwards to the top of the first container 4. Without wishing to be bound by theory, such an arrangement may help to accommodate higher volumetric flows of fluid as the height difference between the fluid level in the first container 4 and the outlet height is increased. This type of spout construction may also help with ease of manufacture. The corresponding inlet 6a located on a side of the second container 6 is also illustrated in FIG. 7. In the depicted embodiment, the inlet 6a is a cut out sized and arranged on the side of the second container 6 to receive the outlet 18 when the second container is inserted into the base 8. Other types of inlets are also possible as the current disclosure is not limited to a corresponding cut out or hole. In addition to illustrating the features of the first and second containers, the exploded perspective views also illustrate the structures located on the base 8 for accommodating the first container 4, the second container 6, and the lights 22.

While an outlet 18 corresponding to a spout has been described above, a nozzle, a siphon, or any other appropriate outlet might be used. For example, and without wishing to be bound by theory, one advantage associated with using a siphon instead of a spout, is that the aquarium may be less prone to spilling water since a minimum fluid level variation is needed to move water from one side of a siphon to another. This is in comparison to the spout depicted in the figures which can result in a fluid level at the same height as the spout. Consequently, a spout would be more prone to spilling water due to small movements or water height variations.

In addition to illustrating the relative orientation and features of various parts described above, FIGS. 6 and 7 also show a fluid level indicator 20 including a float 20a and a float retainer 20b. The fluid level indicator 20 is located on the interior of the second container 6, see FIG. 8A. The float 20a is constructed and arranged to pass through a hole 10b located on the cover 10. As the fluid level in the second container 6 increases, the float 20a displaces upwards such that a top portion of the float 20a extends upwards from the hole 10b to indicate a particular fluid level. While a particular fluid level indicator has been described with respect to the figures, other fluid flow indicators are also possible. For example, an electrical sensor system, a fluid level indicator located on a side of the second container, an optically transparent second container, or any other appropriate method of viewing and/or indicating the fluid level might also be used as the current disclosure is not limited in this fashion.

FIG. 6 also illustrates one embodiment of the association between the first container 4 and the component 14. In the depicted embodiment, the component 14 includes the cover plate 14a and the second portion of the conduit 14b. The second portion of the conduit 14b is shaped somewhat like an L such that it includes a curved section that extends horizontally from the cover plate 14a and a vertically extending section that extends up to tabs 14c located on an upper portion of the component. As noted above, the second portion of the conduit 14b is adapted and arranged to complement the first portion of the conduit located in the first container 4 to form a conduit there between. In the depicted embodiment the second portion of the conduit is shaped and arranged to fit within the first portion of the conduit. This fit between the first and second portions of the conduit may be sized to create an interference fit to help attach the component 14 to the container 4. Additionally, in embodiments including the depicted tabs 14c, the tabs 14c are shaped and arranged to fit in corresponding retention slots 4c located on the first container 4. Depending on the embodiment, the tabs 14c and retention slots 4c may simply retain the upper portion of the second portion of the conduit 14b within the first portion of the conduit 4b. Alternatively, in some embodiments, the tabs 14c and retention slots 4c may create an interference fit and/or be bonded together to attach the component 14 to the first container 4. Thus, the component 14 may be associated with first container 4 using the noted interference fit, the tabs and corresponding retention slots, and/or any other appropriate method as previously mentioned.

Having described the various components of the aquarium above, the functionality of the aquarium is described in detail with respect to FIGS. 8-8B. As indicated by the arrows, fluid is added to the first container 4 in any appropriate fashion such that a fluid level 24 within the first container is greater than a height of the outlet 18. Without wishing to be bound by theory, once the fluid level 24 within the first container is greater than the height of the outlet 18, a pressure differential is created between the drain 12 and the outlet 20. As illustrated by the arrows, this pressure differential results in fluid flowing into the drain 12 corresponding to the cover plate 14a and the waste collection area 4a. The fluid subsequently flows through the conduit 16 and out of the outlet 18. This flow of fluid as well as any waste and debris entrained with the fluid will continue until the fluid level 24 within the first container is less than or equal to the height of the outlet 18. As fluid flows from the first container 4 through the outlet 18 and into the second container 6 a fluid level 26 within the second container increases. As the fluid level 26 within the second container continues to increase, the float indicator 20 will correspondingly rise to indicate the fluid level within the second container. Alternatively, the second container might be transparent such that a separate indication of the fluid level within the second container is unnecessary. Fluid may be added to the first container 4 either until the desired amount of fluid has been added, the waste and debris located in the waste collection area has been removed, and/or the second container 6 is full. The second container 6 may then be emptied and replaced. If desired, this process may then be repeated.

As illustrated by the above description of the aquarium operation, the currently disclosed aquarium provides a simple and easy method to replace the fluid and/or remove waste and debris from within an aquarium. It should be understood, that while a particular aquarium including specific constructions and arrangements of components has been described above, the current disclosure is not limited to only the disclosed aquarium embodiments. For example, the current disclosure might be used with any size or shape aquarium and the various components within the aquarium may also be sized and/or shaped differently. Further, the current disclosure may be used in conjunction with any number of standard pieces of aquarium equipment including, but not limited to, aquarium heaters, filtration systems, and aeration systems.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An aquarium comprising:
a first container extending up to a first height for holding a fluid, wherein the first container includes:
a waste collection area;
an outlet formed in a side of the container at a second height less than the first height; and
a conduit fluidly connecting the waste collection area and the outlet, and wherein fluid flows from the waste collection area to the outlet when fluid is added above a preselected fluid level between the first height and the second height; and
a second container for holding a fluid, wherein the second container is mateable with the first container, wherein the outlet is positionable relative to the second container such that fluid flows from the first container through the outlet and into the second container, and wherein fluid flows from the waste collection area through the outlet and into the second container when fluid is added above the preselected fluid level.

2. The aquarium of claim 1, wherein the outlet is a spout.

3. The aquarium of claim 1, wherein the outlet is a siphon.

4. The aquarium of claim 1, further comprising a base that retains both the first container and the second container in a desired position and orientation, and wherein the second container is removably retained in the base.

5. The aquarium of claim 1, wherein the preselected fluid level corresponds to the second height.

6. The aquarium of claim 1, wherein at least a portion of the waste collection area is a recess formed in the bottom surface of the first container.

7. The aquarium of claim 1, wherein at least a first portion of the conduit is formed in the first container.

8. The aquarium of claim 7, further comprising a component including a second portion of the conduit.

9. The aquarium of claim 8, wherein the component is attached to the first container to position the second portion of the conduit adjacent to the first portion of the conduit and form the conduit between the first portion of the conduit and the second portion of the conduit.

10. The aquarium of claim 9, wherein the component is shaped to be substantially flush with an interior surface of the first container.

11. An aquarium comprising:
a first container extending up to a first height for holding a fluid, wherein the first container includes:
a waste collection area;
an outlet formed in a side of the container at a second height less than the first height;
a first portion of a conduit fluidly connecting the waste collection area and the outlet, wherein the first portion of the conduit is formed in the first container; and
a component including a second portion of the conduit, wherein the component is positionable relative to the first portion of the conduit which together form the conduit between the first portion of the conduit and the second portion of the conduit, wherein fluid flows from the waste collection area through the outlet when fluid is added above a preselected fluid level between the first height and the second height.

12. The aquarium of claim 11, wherein the first portion of the conduit is a channel formed in the first container.

13. The aquarium of claim 12, wherein at least a portion of the waste collection area is a recess formed in a bottom surface of the first container.

14. The aquarium of claim 13, wherein the component further comprises a cover plate that covers the waste collection area when the component is positioned relative to the second portion of the conduit to form the conduit.

15. The aquarium of claim 11, wherein the outlet is a spout.

16. The aquarium of claim 11, wherein the outlet is a siphon.

17. The aquarium of claim 11, further comprising a second container for holding a fluid, wherein the second container is mateable with the first container, wherein the outlet is positionable relative to the second container such that fluid flows from the first container through the outlet and into the second container.

18. The aquarium of claim 11, wherein the component is removably attachable to the first container.

19. The aquarium of claim 11, wherein the component is shaped to be substantially flush with an interior surface of the first container.

20. The aquarium of claim 1, wherein the outlet is positionable relative to the second container such that the outlet is received in the second container.

21. The aquarium of claim 17, wherein the outlet is positionable relative to the second container such that the outlet is received in the second container.

22. An aquarium comprising:
a container for holding a fluid, wherein the first container includes:
a waste collection area;

an outlet of the container; and a conduit fluidly connecting the waste collection area and the outlet, wherein at least a first portion of the conduit is formed in the container; and a component including a second portion of the conduit, wherein the component is attached to the container to position the second portion of the conduit adjacent to the first portion of the conduit and form the conduit between the first portion of the conduit and the second portion of the conduit, wherein the component is shaped to be substantially flush with an interior surface of the container.

23. The aquarium of claim 22, wherein the container extends up to a first height, wherein the outlet is formed in a side of the container at a second height less than the first height, and wherein fluid flows from the waste collection area to the outlet when fluid is added above a preselected fluid level between the first height and the second height.

24. The aquarium of claim 22, wherein at least a portion of the waste collection area is a recess formed in a bottom surface of the container.

25. The aquarium of claim 24, wherein the component further comprises a cover plate that covers the waste collection area.

* * * * *